United States Patent [19]
Ueda

[11] Patent Number: 5,291,748
[45] Date of Patent: Mar. 8, 1994

[54] AIR CONDITION CONTROL APPARATUS

[75] Inventor: Matsuei Ueda, Aichi, Japan

[73] Assignee: Kabushiki Kaisha Toyota Chuo Kenkyusho, Aichi, Japan

[21] Appl. No.: 962,109

[22] Filed: Oct. 16, 1992

[30] Foreign Application Priority Data

Sep. 11, 1991 [JP] Japan .................................. 4-269520
Oct. 16, 1991 [JP] Japan .................................. 3-298254

[51] Int. Cl.$^5$ ............................................. F25D 17/00
[52] U.S. Cl. ......................... 62/179; 236/78.0; 395/21
[58] Field of Search .......................... 236/91 C–91 X, 236/78 D; 62/179; 395/21 X

[56] References Cited

U.S. PATENT DOCUMENTS

| | | | |
|---|---|---|---|
| 5,145,112 | 9/1992 | Ueda | 236/49.3 |
| 5,172,856 | 12/1992 | Tanaka et al. | 236/91 C |
| 5,187,943 | 2/1993 | Taniguchi et al. | 236/91 C |

FOREIGN PATENT DOCUMENTS

| | | |
|---|---|---|
| 1-229713 | 9/1989 | Japan . |
| 4-86441 | 3/1992 | Japan . |
| 4-158140 | 6/1992 | Japan . |

Primary Examiner—William E. Wayner
Attorney, Agent, or Firm—Oblon, Spivak, McClelland, Maier & Neustadt

[57] ABSTRACT

An air condition control apparatus includes: a thermal sensation estimating device for estimating an actual thermal sensation on the basis of the history of a thermal sensation information in a predetermined period output from an indirect thermal sensation information detecting device for detecting information relating to a thermal sensation in the vicinity of a human in a room; a control pattern storage device for storing a predetermined thermal sensation control pattern for achieving a target thermal sensation; a control value determining device for determining control values of air to be supplied into the room so that the thermal sensation output from the thermal sensation estimating device coincides with the stored thermal sensation control pattern; an air condition control device for controlling the temperature of the air to be supplied into the room, on the basis of the control value output from the control value determining device; and an air blower for supplying the temperature-controlled air into the room in accordance with the control value determined by the control value determining device. The apparatus adequately controls the air conditioning irrespective of the position and direction of an occupant's face.

14 Claims, 10 Drawing Sheets $X = \sum_{i=1}^{n} w_i \times 1$    $Y = \dfrac{1}{1+e^{-(X-\theta)}}$ $\theta$: THRESHOLD VALUE $Y = \dfrac{1}{1+e^{-(X-\theta)}}$

AIR CONDITION CONTROL APPARATUS

BACKGROUND OF THE INVENTION

This invention relates to an air condition control apparatus, and more particularly to an air condition control apparatus which is suitable for controlling an air conditioning of a room of a vehicle.

DESCRIPTION OF THE RELATED ART

A conventional air condition control apparatus of this kind is disclosed in Unexamined Japanese Patent Publication No. HEI 1-229713. This apparatus estimates the thermal sensation of an occupant only from the current skin temperature of the occupant and controls an air conditioner on the basis of the estimated thermal sensation.

As a conventional control apparatus for an air conditioner, Unexamined Japanese Patent Publication No. HEI 4-158140 discloses a control apparatus in which, in order to conduct a comfortable air conditioning using an air conditioner incorporating a microcomputer, the temperature, air volume and wind direction of the interior of a room are controlled so that the comfortableness of a human staying in the room is enhanced.

In the air condition control apparatus of the former case, however, the measurement of a skin temperature of an occupant involves the following problem. When the air conditioning is to be conducted by the above-mentioned air condition control apparatus, it is necessary to always measure the skin temperature. In a case of an automobile, it is infrequent that an occupant regularly sits while looking forward. For example, a driver moves the face to confirm the safety, and a fellow occupant moves the face to talk with another occupant. In the conventional apparatus, there is a problem in that, when the face of an occupant is outside the area of measuring a skin temperature, it is impossible to correctly measure the skin temperature, resulting in that the air conditioning is not adequately conducted.

In the control apparatus for an air conditioner of the latter case, a neural network (NN) is used to output a human sense of comfortableness while environment conditions of the interior and exterior of the room and conditions of a human are supplied as inputs. The output of this neural network is a predicative mean vote number (PMV) or a standard new effective temperature (SET). The predicative mean vote number (PMV) or standard new effective temperature (SET) is an index which deals with a human sense of comfortableness (thermal sensation) in a steady state. Therefore, there arises a problem in that they cannot correctly represent a human sense of comfortableness (thermal sensation) in a transient state.

SUMMARY OF THE INVENTION

The invention has been conducted to solve the above-mentioned problems in the prior art.

An object of the present invention is to provide an air condition control apparatus which does not directly measure a skin temperature, but measures an air temperature, humidity and wind velocity of the vicinity of a face, and a volume of solar radiation applied to the vicinity of the face, and in which, from these data, the thermal sensation estimating means for measuring the change of the skin temperature of the face continuously obtains information corresponding to the skin temperature irrespective of the position and direction of the face of an occupant, and an adequate air condition control can be conducted using the continuous information.

It is another object of the invention to provide an air condition control apparatus which can correctly indicate the condition of a human even in a transient state and without checking whether a skin temperature indicates a change in the condition of a human and is in a transient state, thereby conducting an adequate air condition control.

To achieve the objects, the air condition control apparatus of the invention comprises: indirect thermal sensation information detecting means for detecting information relating to a thermal sensation of the vicinity of a human in a room (e.g., compartment); thermal sensation estimating means for estimating the actual thermal sensation on the basis of a history of thermal sensation information of a predetermined period, said thermal sensation information being output from said indirect thermal sensation information detecting means; control pattern storage means for storing a predetermined thermal sensation control pattern for achieving a target thermal sensation; control value determining means for determining control values of air to be supplied into the room such as an air volume, a temperature, so that a thermal sensation output from said thermal sensation estimating means coincides with the thermal sensation control pattern stored in said storage means; air condition control means for controlling the temperature of the air to be supplied into said room, on the basis of the control values output from said control value determining means; and an air blower for supplying the temperature-controlled air into said room in accordance with the control values determined by said control value determining means.

In the air condition control apparatus of the invention having the above-mentioned configuration, the indirect thermal sensation information detecting means detects information relating to a thermal sensation in the vicinity of an occupant in a room, the thermal sensation estimating means estimates an actual thermal sensation on a basis of the history of a thermal sensation information in a predetermined period, said thermal sensation information being output from said indirect thermal sensation information detecting means, control pattern storage means stores a predetermined thermal sensation control pattern for achieving a target thermal sensation, the control value determining means determines control values of air to be supplied into said room so that a thermal sensation output from said thermal sensation estimating means coincides with a thermal sensation control pattern stored in said storage means, the air condition control means controls a temperature of said air to be supplied into said room, on a basis of said control value output from said control value determining means, and the air blower supplies said temperature-controlled air into said room in accordance with said control value determined by said control value determining means.

Alternatively, the thermal sensation estimating means having the following construction as shown in U.S.P. 5,145,112 may be employed. For example, the thermal sensation estimating means may have as input values one or both of the thermal sensation information detected by the indirect thermal sensation information detecting means and the thermal sensation information detected by the direct thermal sensation information detecting means. The thermal sensation estimating means to which the input values are input is composed of a neutral network having a plurality of computation elements for performing a non-linear computation on the input values. Each computation element has a constant previously adjusted so that the output from the thermal sensation estimating means corresponds with the thermal sensation of the occupant. In each computation element, the input value to the element is multiplied with the constant, followed by the non-linear computation, and is output to the next element. The thermal sensation estimating means estimates the thermal sensation of the occupant based on the final output value and thus functions as a means for converting the thermal sensation information into the actual thermal sensation.

Since a non-linear transformation is performed during the transformation of information, the present apparatus can cope with a non-linear information processing as well as a linear information processing.

In the air condition control apparatus of the invention, information relating to a thermal sensation of the vicinity of a human is detected by the indirect thermal sensation information detecting means. On the basis of a history of thermal sensation information of a predetermined period and output from the indirect thermal sensation information detecting means, the thermal sensation estimating means can estimate the actual thermal sensation. Accordingly, the air condition control apparatus of the invention can always obtain information corresponding to the skin temperature irrespective of the position, direction and so on of a human's face, thereby accurately realizing a control pattern of a desired thermal sensation to adequately conduct the air condition controlling.

DETAILED DESCRIPTION OF THE PREFERRED EMBODIMENTS

Figure 1:
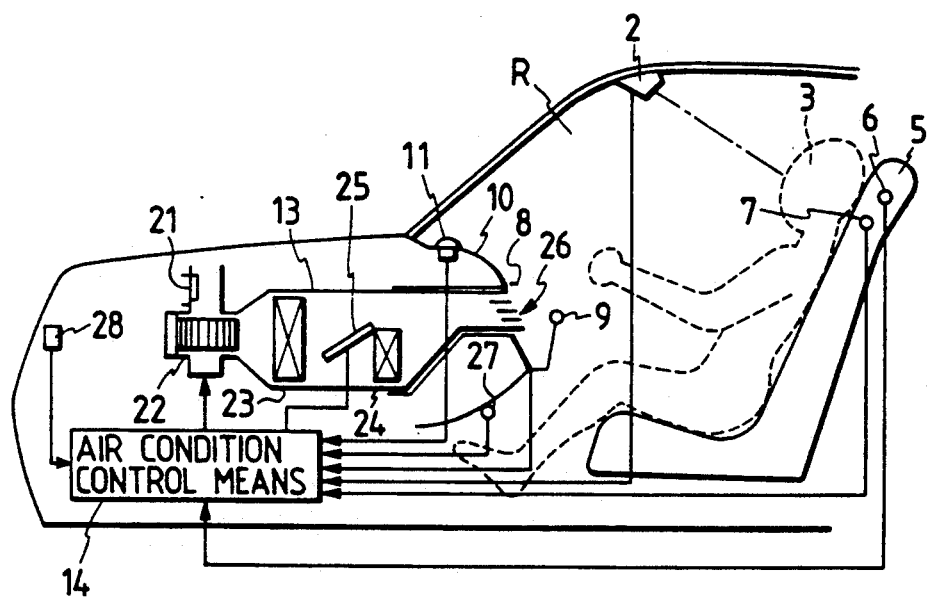
FIG. 1 is a schematic diagram showing the configuration of a first embodiment of the invention.

A first embodiment of the invention will be described with reference to FIGS. 1 and 2. An infrared thermometer 2 which functions as direct thermal sensation information detecting means 1 and detects a skin temperature of a face is a sensor of the infrared detector type for detecting in a non-contact manner a skin temperature of the face 3 of a occupant.

An instrument which functions as the indirect thermal sensation information detecting means 4 and detects an environment information such as a temperature, humidity and wind velocity of its vicinity in a room R of an automobile comprises a thermocouple thermometer 6 and hygrometer 7 attached to a headrest 5, an anemometer 9 disposed on a front grill 8, and a pyrheliometer 11 mounted on a dash board 10. The anemometer may be provided in the vicinity of a human's face.

The indirect thermal sensation information detecting means 4 is structured so that the thermocouple thermometer 6 and hygrometer 7 respectively obtain a temperature and humidity of the vicinity of the face and the anemometer 9 and pyrheliometer 11 respectively obtain a wind velocity and volume of solar radiation in the vicinity of the face, and further comprises skin-temperature storage means 12 for storing a skin temperature which is previously estimated. A skin temperature at the start of the process of estimating the skin temperature is obtained by the infrared thermometer 2. The invention is not restricted to the configuration of the first embodiment. Alternatively, the initial skin temperature obtained through a thermal sensation button 41 and translation table storage means 42 may be set as the skin temperature at the start of the process of estimating the skin temperature.

Alternatively, brain waves, sphygmus, skin potential, etc. may be used as thermal sensation information. Instead of directly measuring thermal sensation information of a human body, a signal from a human body-equivalent sensor or model which produces a signal equivalent to that in a human body may be used as thermal sensation information.

Figure 2:
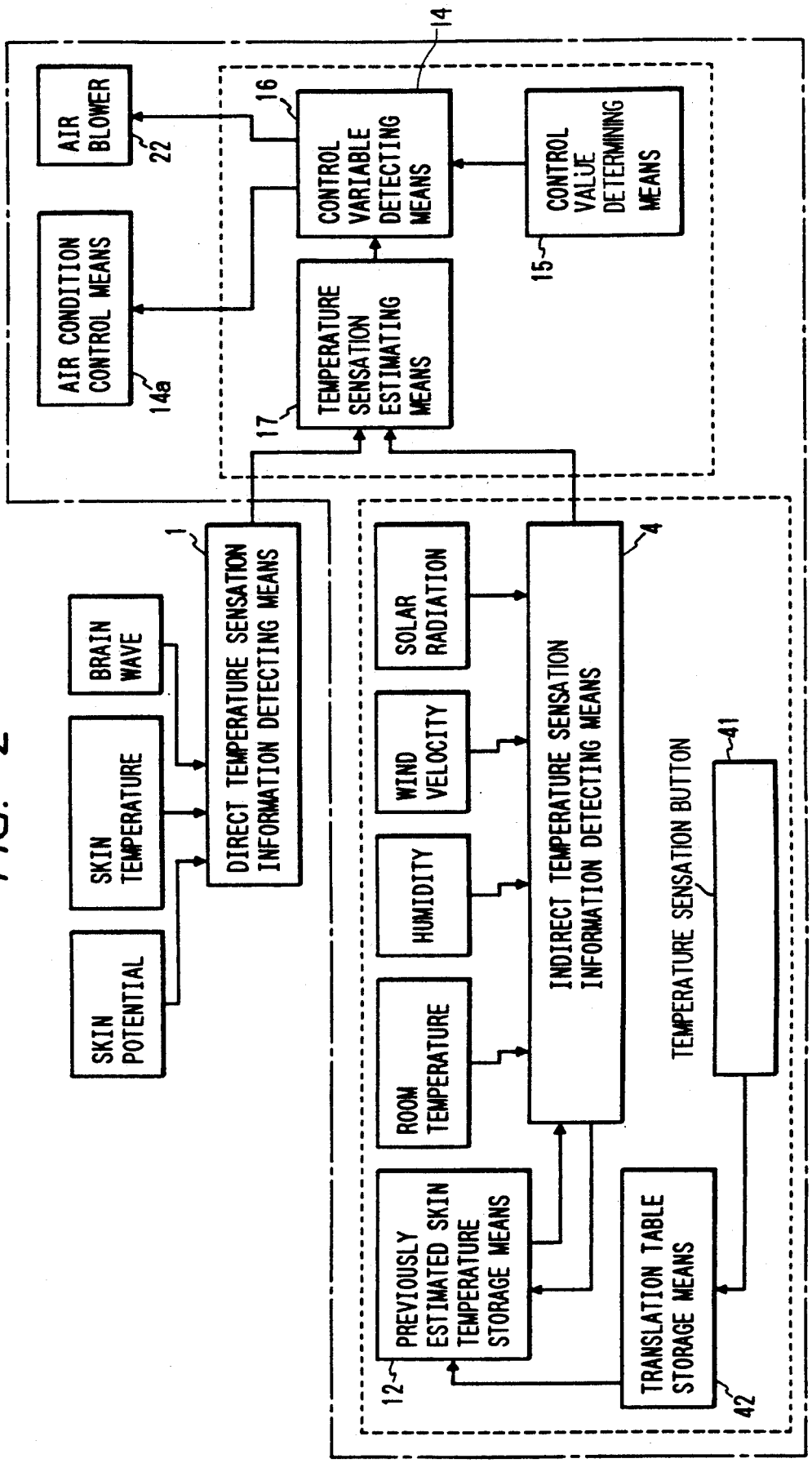
FIG. 2 is a block diagram showing the configuration of the first embodiment.

A control apparatus 14 for controlling an air condition unit 13 is composed of the components which are enclosed by a long broken line of FIG. 2. Among the components constituting the control apparatus 14, control pattern storage means 15, control value determining means 16 and thermal sensation estimating means 17 are realized by a microcomputer. The thermal sensation estimating means 17 consists of a memory for storing outputs from the infrared thermometer 2 in time series, and a neural network which receives data stored in the memory and estimates the current thermal sensation of an occupant.

Figure 3:
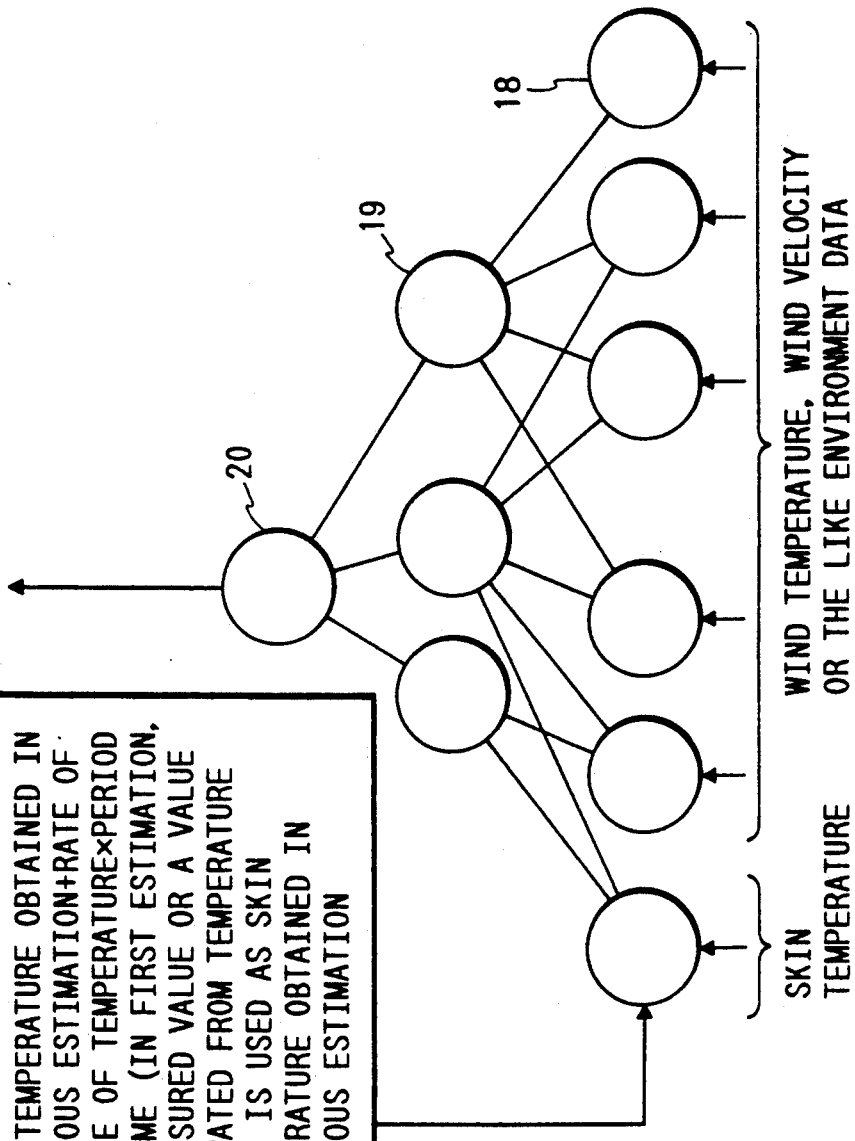
FIG. 3 is a diagram showing the configuration of indirect thermal sensation information detecting means of the first embodiment of the invention.

In the indirect thermal sensation information detecting means 4, the portion for estimating the thermal sensation is constituted by a neural network shown in FIG. 3. In the neural network, the skin temperature at the start of the process of estimating the skin temperature is input as the actual skin temperature to an input layer 18 for estimating the thermal sensation, and the temperature, humidity, wind velocity and volume of solar radiation of the vicinity of the face are input to the input layer 18 for estimating the thermal sensation.

Figure 4A:
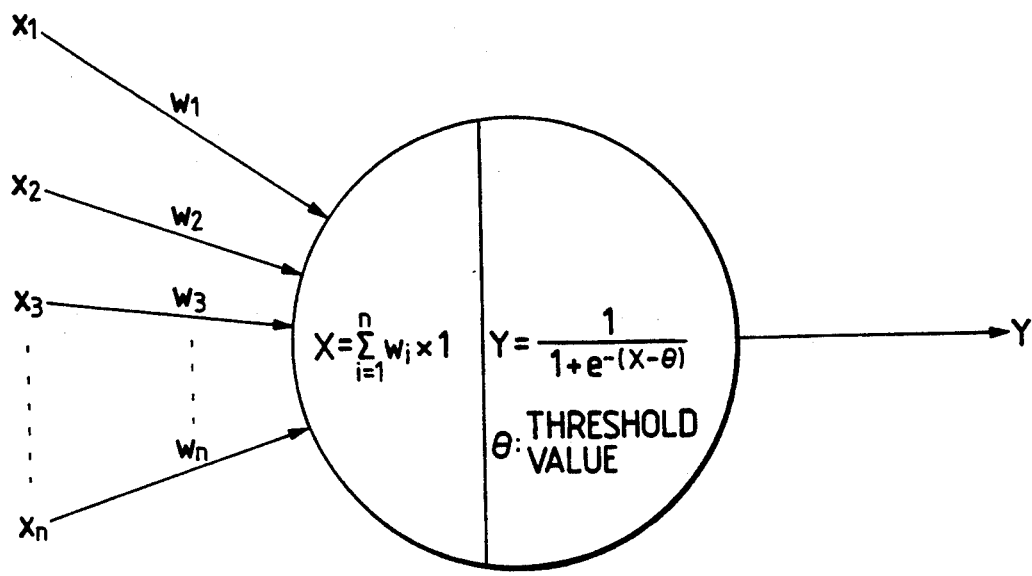
FIG. 4(a) is a diagram illustrating the relationship between the input and output of elements of the indirect thermal sensation information detecting means used in the first embodiment of the invention.
Figure 4B:
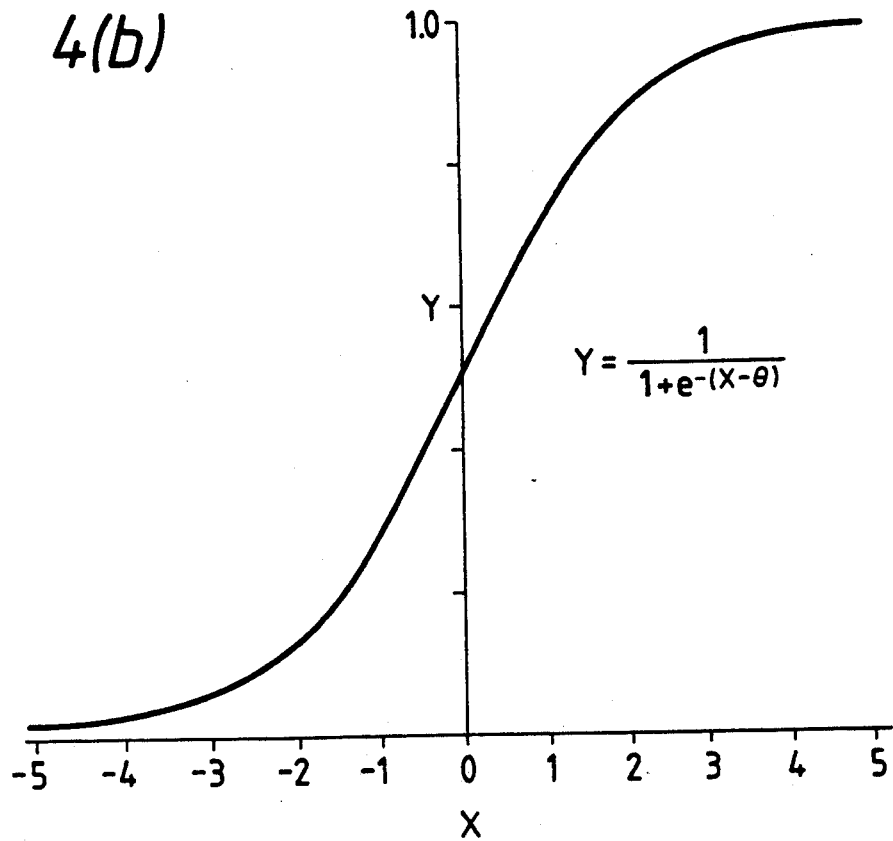
FIG. 4(b) is a graph illustrating characteristics of the elements of the indirect thermal sensation information detecting means used in the first embodiment of the invention.

The neural network which is the indirect thermal sensation information detecting means 4 in the embodiment has a three-layer structure composed of the input layer 18, an intermediate layer 19 and an output layer 20. The input layer 18 consists of six elements, the intermediate layer 19 three elements, and the output layer 20 one element. As shown in FIG. 4, each of the elements has a non-linear input/output relationship which is expressed by $$X = \Sigma wixi$$

$$Y = 1/(1+\exp(-(X-\theta)))$$

where xi is a value input to the respective element from the layer of the previous stage, wi is a coupling weight between elements, $\theta$ is a threshold value of each element, and $\Sigma$ indicates the total sum of all xi values which are input. However, only the input layer 18 shown in FIG. 3 performs the identity change of Y=X.

The output layer 20 shown in FIG. 3 outputs the rate of change of the skin temperature of an occupant.

In the indirect thermal sensation information detecting neural network, the threshold values of the elements and weights between elements are determined in an education which is previously conducted.

Figure 5:
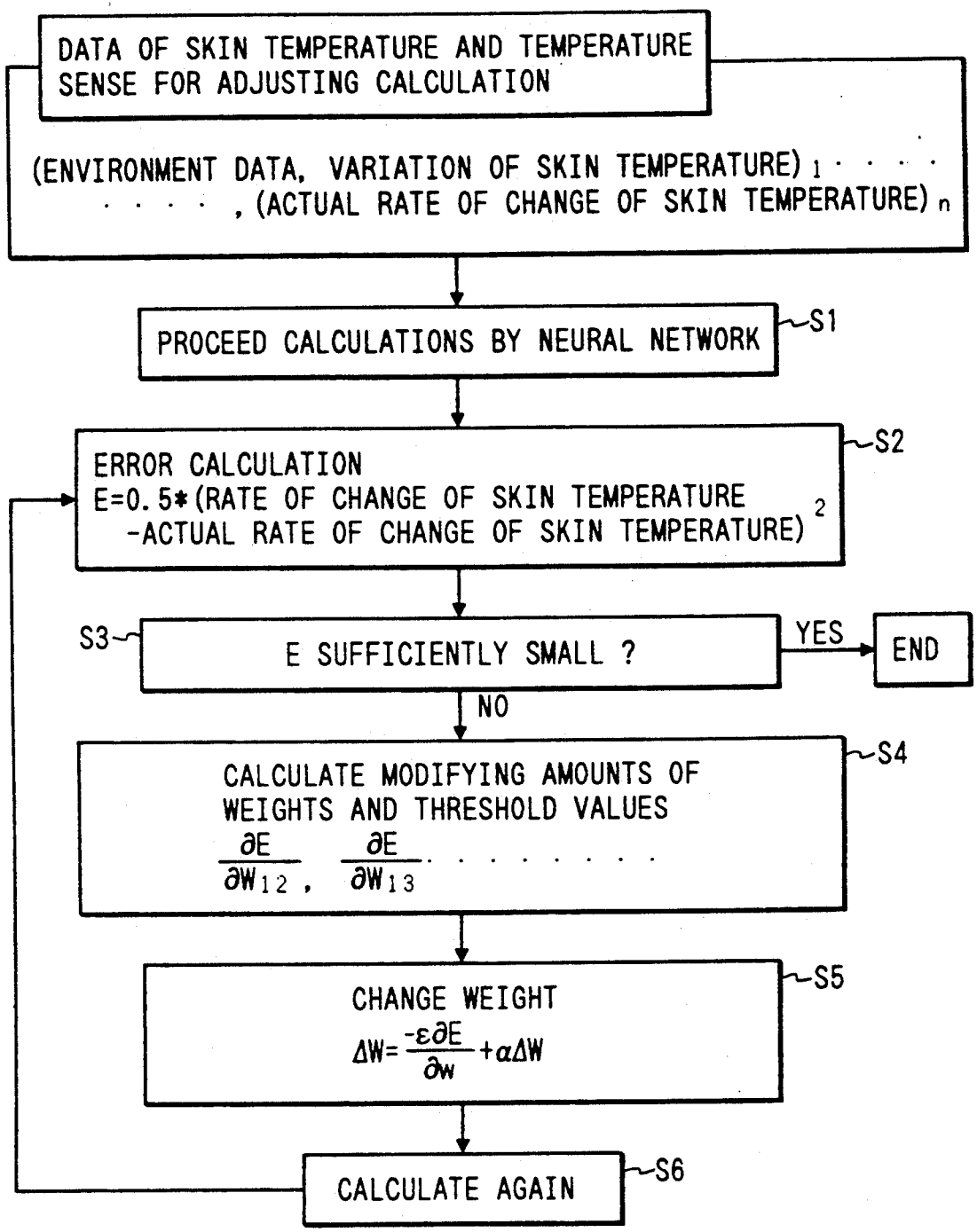
FIG. 5 is a flowchart of the adjusting method of the indirect thermal sensation information detecting means used in the first embodiment of the invention.

In this education, experiments are conducted under various air conditioning states on several male and female subjects, and the variation of the skin temperature and environment data in these experiments are input as education data. On the basis of the education data, the threshold values and weights are calculated in the steps shown in FIG. 5.

Step 1: In S1 of FIG. 5 (proceed calculations of neural network step), the education data are input into the input layer 18. The threshold values of and weights between the elements are previously given as random numbers, and calculations proceeds under this state to the output layer 20 through the intermediate layer 19, to obtain the rate of change of the skin temperature.

Step 2: In S2 of FIG. 5, the difference (error) between the rate of change of the skin temperature Y and the actual rate of change of the skin temperature D is calculated by the following expression:

$$E = 0.5*(Y-D)^2$$

Step 3: In S3 of FIG. 5, when the error obtained in S2 is sufficiently small, the weights and threshold values obtained at that time are stored in the memory, and the process is terminated. When the error is large, the variation amounts of the weights are calculated in the process of S4 and the following steps.

Step 4: In S4 of FIG. 5, the modifying amounts of the weights and threshold values are calculated on the basis of the following expression:

$$\partial E/\partial Y = Y - D$$

The modifying amount of the threshold value of the output layer 20 is calculated by:

$$\begin{aligned}\partial E/\partial \theta &= \partial E/\partial Y \cdot \partial Y/\partial X \cdot \partial X/\partial \theta \\ &= -\partial E/\partial Y \cdot Y(1-Y)\end{aligned}$$

Then, $$\begin{aligned}\partial E/\partial X &= \partial E/\partial Y \cdot \partial Y/\partial X \\ &= \partial E/\partial Y \cdot Y(1-Y)\end{aligned}$$

The modifying amount of the weight (wiOUT) between the ith element of the intermediate layer 19 and the output layer 20 is calculated by:

$$\begin{aligned}\partial E/\partial wiout &= \partial E/\partial X \cdot \partial X/\partial wiOUT \\ &= \partial E/\partial X \cdot yi\end{aligned}$$

where yi is the ith output of the intermediate layer 19. The contribution rate of the ith output yi of the intermediate layer 19 to the error is obtained by:

$$\begin{aligned}\partial E/\partial yi &= \partial E/\partial X \cdot \partial X/\partial yi \\ &= \partial E/\partial X wiOUT\end{aligned}$$

The contribution rate of the ith threshold value $\theta i$ of the intermediate layer 19 to the error is obtained by:

$$\begin{aligned}\partial E/\partial \theta i &= \partial E/\partial y \cdot \partial y/\partial xi \cdot \partial xi/\partial \theta i \\ &= -\partial E/\partial yi \cdot yi(1-yi)\end{aligned}$$

When the value input to the ith element of the intermediate layer 19 is indicated by xi, the following expression can be held:

$$\begin{aligned}\partial E/\partial xi &= \partial E/\partial yi \cdot \partial yi/\partial xi \\ &= \partial E/\partial yi \cdot yi(1-yi)\end{aligned}$$

The contribution rate of the weight wij between the jth element of the input layer 18 and the ith element of the intermediate layer 19 can be obtained by:

$$\begin{aligned}\partial E/\partial wij &= \partial E/\partial xi \cdot \partial xi/\partial wij \\ &= \partial E/\partial xi \cdot yj'\end{aligned}$$

where yj' is the jth output of the input layer 18. From the above expressions, the modifying amounts of the threshold values of the elements and the weights between the elements are calculated.

Step 5: In S5 of FIG. 5, using $\partial E/\partial w$, $\partial E/\partial \theta$, etc. obtained in S4, the modifying amounts are calculated by:

$$\Delta w(t) = -\epsilon \cdot \partial E/\partial w + \alpha \cdot \Delta w(t-1)$$

where $\Delta w(t-1)$ is the modifying amount in the previous modification, and $\epsilon$ and $\alpha$ are constants. The actual modification of the weight is conducted by the following expression:

$$w = w + \Delta w$$

Step 6: In S6 of FIG. 5, after data are modified in S5, calculations similar to those in S1 are conducted, and then the process returns to S2.

The above-mentioned procedures of Steps 1 to 6 are repeated, and the weights and threshold values obtained when the error becomes sufficiently small are set in the indirect thermal sensation information detecting neural network. The thermal sensation estimating means 17 conducts the conversion to a thermal sensation on the basis of the skin temperature output from the indirect thermal sensation information detecting means 4.

Figure 6A:
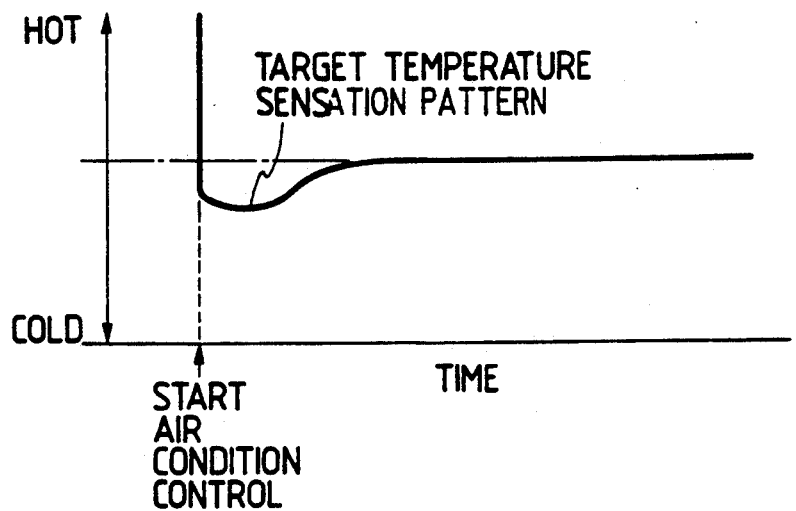
FIG. 6(a) is a graph showing an example of the thermal sensation control pattern of the first embodiment of the invention.
Figure 6B:
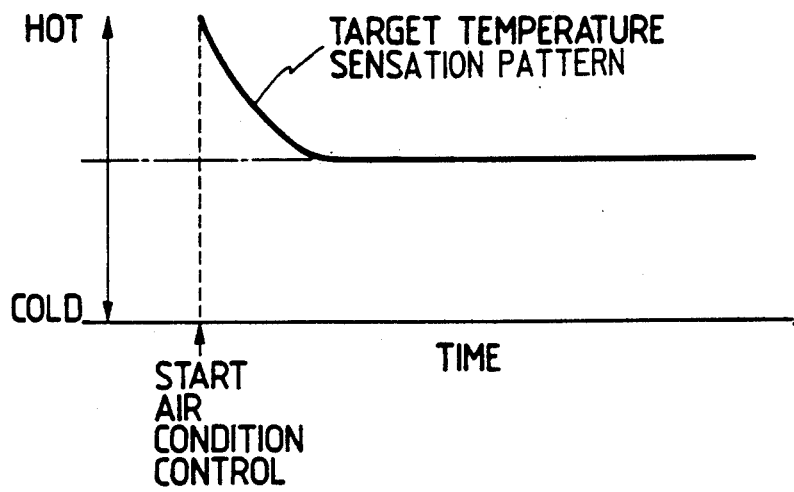
FIG. 6(b) is a graph showing another example of the thermal sensation control pattern of the first embodiment of the invention.
Figure 6C:
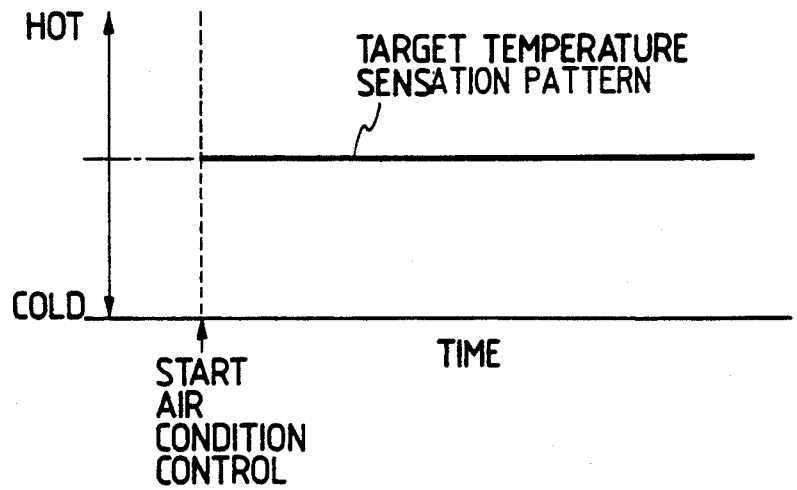
FIG. 6(c) is a graph showing a further example of the thermal sensation control pattern of the first embodiment of the invention.

The control pattern storage means 15 stores a previously set pattern in which the target thermal sensation changes with time. For example, such a previously set pattern may be a case in which, as shown in FIG. 6(a), a slightly cold state is initially set and then a neutral state where it is neither hot nor cold is set, a case in which, as shown in FIG. 6(b), the target gradually approaches a neutral state from the beginning, or a case in which, as shown in FIG. 6(c), the target is kept set to a neutral state from the beginning. Similarly, a previously set pattern for a heating season may be selected from several kinds of patterns.

In the first embodiment, the pattern of FIG. 6(c) in which the target is kept set to a neutral state from the beginning is employed as the previously set pattern. Alternatively, any of other temperature control patterns including the above-mentioned ones may be employed. When the control pattern storage means 15 stores two or more kinds of patterns, the control apparatus may be modified so that the most suitable pattern is selected from the stored patterns according to a occupant's choice.

The control value determining means 16 obtains the deviation of the thermal sensation estimated by the thermal sensation estimating means 17 from the thermal sensation control pattern previously stored in the control pattern storage means 15, and calculates the variation amounts of the temperature of the wind, wind velocity, etc. on the basis of the deviation. The air condition unit 13, which has a known structure, comprises a ventilation switching device 21, an air blower 22, an evaporator 23, a heater core 24, an air-mixing damper 25, a ventilation air outlet 26, etc.

The air condition control means 14a controls the temperature of a temperature-controlled air supplied into the room R, on the basis of the control values output from the control value determining means 16, by controlling the evaporator 23, heater core 24 and air-mixing damper 25.

The air blower 22, which is a vane type blower having many vanes on its outer periphery, is mounted in the vicinity of the air inlet of the air condition unit 13. The air blower 22 sends the air which has been subjected to the temperature control by the air condition control means 14a, to the room R in accordance with the air volume determined by the control value determining means 16.

The invention is not restricted to the first embodiment described above. For example, the present air condition control apparatus may be realized without using the direct thermal sensation information detecting means 1 of the first embodiment, and only by the system shown by a one-dot chain line in FIG. 2, i.e., the indirect thermal sensation information detecting means 4. This embodiment can accomplish the substantially same effects as those of the first embodiment.

The function of the first embodiment will now be described. The infrared thermometer 2 which functions as the direct thermal sensation information detecting means 1 measures the actual thermal sensation information of the occupant, namely, a skin temperature of the face 3 of the driver. The occupant's skin temperature obtained by the infrared thermometer 2 is input to the thermal sensation estimating means 17, at the beginning of the estimation of the skin temperature. On the other hand, the thermocouple thermometer 6, hygrometer 7, anemometer 9 and pyrheliometer 11 which function as the indirect thermal sensation information detecting means 4 measure the thermal sensation information of the periphery environment of the occupant, i.e., the temperature, humidity, wind velocity and volume of solar radiation in the vicinity of the face of the driver, respectively. From the thermal sensation information of the periphery environment of the occupant obtained by the thermocouple thermometer 6, hygrometer 7, anemometer 9 and pyrheliometer 11, the indirect thermal sensation information detecting means 4 obtains the change of the skin temperature and supplies it to the thermal sensation estimating means 17.

The indirect thermal sensation information detecting means 4 produces as an output value the rate of change of the skin temperature obtained during several seconds. Then, the skin temperature is estimated on the basis of the rate of change of the temperature. More specifically, the skin temperature is obtained from the expression of the skin temperature=the skin temperature obtained in the previous estimation+the rate of change of the temperature×period of time (in the first estimation, a measured value or a value estimated from the thermal sensation is used as the skin temperature obtained in the previous estimation).

In this case, the initial value of the skin temperature is obtained by either of the following methods: the skin temperature is actually measured only for the first estimation; the actual thermal sensation is input at the start of the estimation process, and the skin temperature is estimated on the basis of this input thermal sensation; or the skin temperature is estimated from temperatures of the interior and exterior of the room R. In the second and succeeding estimation process, the skin temperature is estimated from the above-mentioned expression on the basis of the rate of change of the temperature and initial skin temperature obtained the indirect thermal sensation information detecting means 4, and the estimated skin temperature is supplied as the initial skin temperature for the next estimation. The change of the skin temperature thus obtained in the indirect thermal sensation information detecting means 4 is input to the thermal sensation estimating means 17, and the thermal sensation is estimated by a recurrence formula or neutral network in the thermal sensation estimating means 17. Thereafter, the control value determining means 16 compares the estimated thermal sensation with the thermal sensation previously stored in the control pattern storage means 15, and obtains the deviation therebetween. If the estimated thermal sensation is shifted toward the cold region, control values are transmitted to the air condition control apparatus 14 so that the heating strength is increased when it is a heating season, or the cooling capacity is reduced when it is a cooling season. By repeating the above-mentioned control pattern, the temperature of the room is maintained at the state fitting to the thermal sensation.

Figure 7:
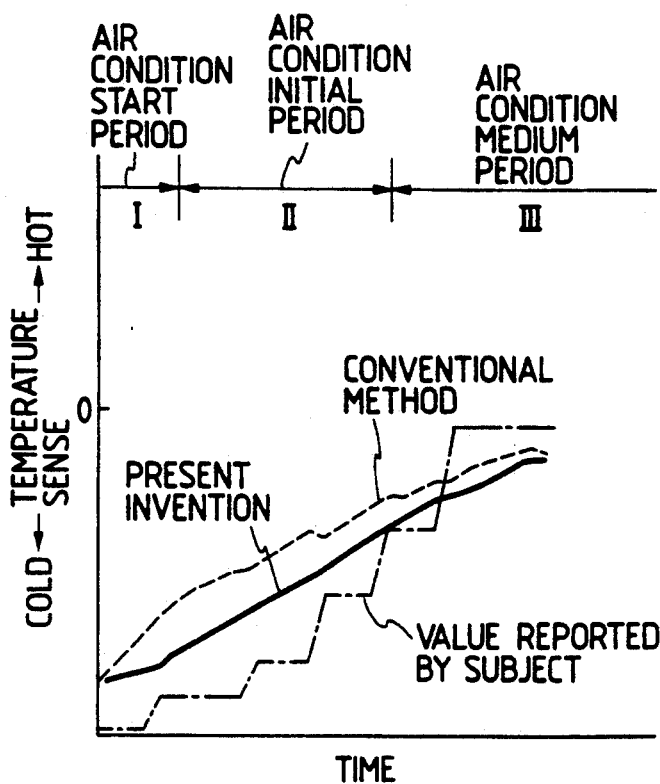
FIG. 7 is a graph of results of thermal sensation estimation conducted in the first embodiment of the invention.

FIG. 7 shows comparisons between the following results which were obtained in the experiments conducted under the conditions that the exterior air temperature was −10 C., the initial room temperature was −10 C. and solar radiation was not available: the thermal sensation estimated by the thermal sensation estimating means of the first embodiment; the thermal sensation estimated by a conventional method in which a recurrence formula using a measured skin temperature and the rate of change of the skin temperature as values was used to estimate the thermal sensation of a subject; and the values which the subject actually reported.

In the conventional method, the thermal sensation is estimated merely with using the current skin temperature and its rate of change, and therefore the estimated thermal sensation in the air condition start period I and the air condition initial period II does not coincide with the value reported by the subject. This is caused by the fact that the sense of a human does not depend on the current skin temperature but is largely affected by the time-variation history of the skin temperature change. In the conventional method in which the history of past skin temperatures is not considered, accordingly, the skin temperature steeply changes so that the accuracy of the thermal sensation estimation is degraded in the air condition start period I and air condition initial period II wherein the time-variation history is of the skin temperature change exerts large influence. Furthermore, since the thermal sensation is estimated on the basis of the skin temperature measured when this estimation is to be done, the conventional method is greatly affected by the accuracy of the thermal sensation measurement, with the result that the dispersion of measured values of the skin temperature causes estimated values of the thermal sensation to scatter.

On the other hand, the inputs of the thermal sensation estimating means 17 include the history of the skin temperature. Therefore, the thermal sensation can be estimated with a high accuracy, even in a case that the skin temperature steeply changes as observed in the air condition start period I and air condition initial period II shown in FIG. 7, namely even in a case that the time-variation history of the skin temperature change greatly affects the thermal sensation of a occupant. Moreover, since the history of the skin temperature is used, it naturally becomes possible to consider an ascending or descending tendency of the skin temperature, and also the variation manner of the change rate of the skin temperature, whereby the thermal sensation can be estimated with a high accuracy.

As seen from the above, the thermal sensation estimating means 17 of the first embodiment can estimate the thermal sensation with a higher accuracy as compared with a conventional one. The control value determining means 16 determines the control values such as the air temperature and air volume on the basis of the estimated result of the thermal sensation. In accordance with the control values, the air condition control means 14 changes the opening of the air-mixing damper 25 and the preset temperature of the evaporator 23 and heater core 24. The hot air which has been controlled by the air condition control means 14 is regulated in wind velocity by the air blower 22 shown in FIG. 1 in accordance with the output of the control value determining means 16, and then introduced into the room R.

The air condition control apparatus of the first embodiment performs the air condition control so as to obtain an adequate wind temperature and wind velocity while estimating the thermal sensation on the basis of the skin temperatures of a occupant which have been obtained in a period from the past to the present. Therefore, the air condition control apparatus of the first embodiment can more accurately estimate the thermal sensation and more quickly bring it close to the target thermal sensation than the prior art in which the thermal sensation is obtained by a recurrence formula using the present skin temperature.

Figure 8:
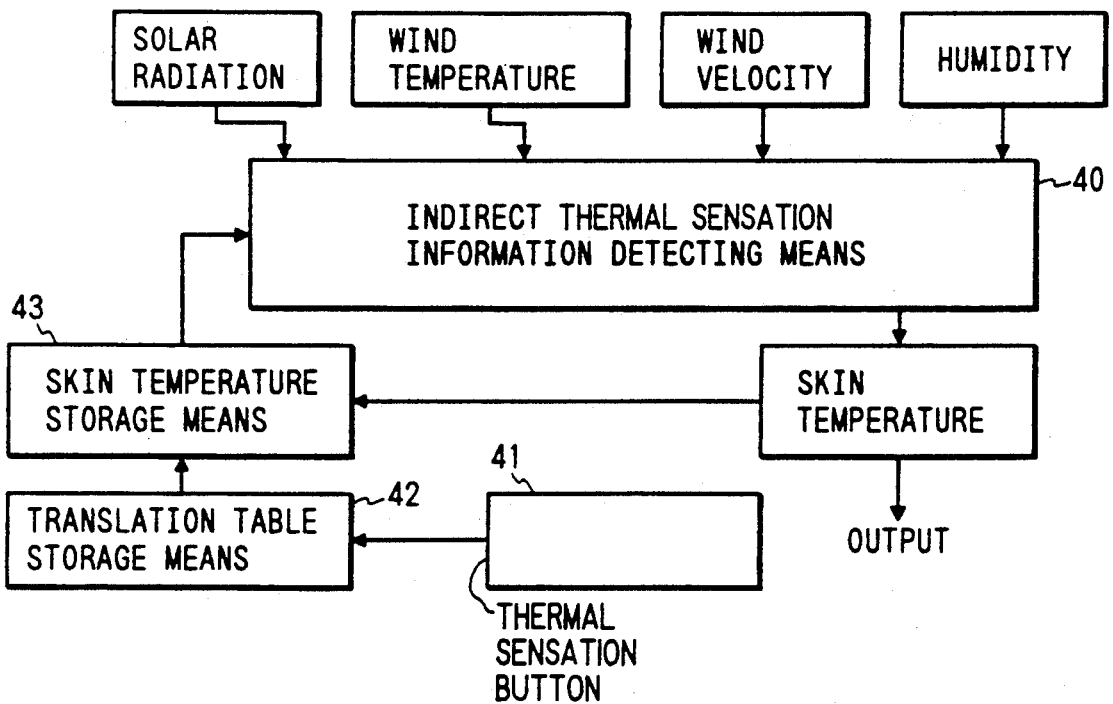
FIG. 8 is a block diagram showing the configuration of a second embodiment of the invention.
Figure 9:
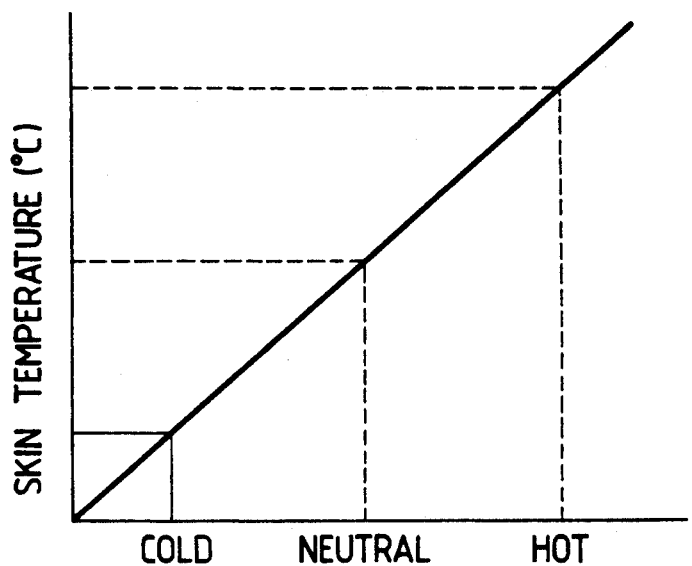
FIG. 9 is a graph showing the relationship between a skin temperature and a thermal sensation in the second embodiment of the invention.

A second embodiment of the invention will be described with reference to FIGS. 1, 8 and 9. The instrument which detects the wind temperature, wind velocity, humidity and volume of solar radiation in the vicinity of a face in the room R in order to detect data for being input to indirect thermal sensation information detecting means 40 comprises a thermocouple thermometer 6 and hygrometer 7 attached to a headrest 5, an anemometer 9 disposed on a front grill 8, and a pyrheliometer 11 mounted on a dash board 10.

The thermal sensation button 41 through which a occupant inputs the thermal sensation at the time of riding in an automobile is disposed on the front grill 8. As shown in FIG. 8, the apparatus of the second embodiment comprises translation table storage means 42 which stores a translation table for converting thermal sensation information output from the thermal sensation button 41 into the skin temperature of the occupant, and skin temperature storage means 43 for storing the skin temperature estimated in the previous estimation.

The function of the thus configured apparatus of the second embodiment will now be described.

After riding in the automobile, the occupant turns on the switch of an air condition unit and at the same time inputs the thermal sensation at the time of riding through the thermal sensation button 41. The input thermal sensation is entered into the translation table storage means 42 in the next stage, and converted therein to the skin temperature of the face by the translation table. The translation table is a translation table stored in the translation table storage means 42, and consists of data of a graph such as shown in FIG. 9. When the occupant pushes the thermal sensation button representing "cold", the converted skin temperature is obtained, and its value is output.

This converted skin temperature is input as the skin temperature at the starting time into the skin temperature storage means 43, and then into the indirect thermal sensation information detecting means 40. The indirect thermal sensation information detecting means 40 receives the current skin temperature from the skin temperature storage means 43, and also the volume of solar radiation, wind temperature, wind velocity and humidity, and, on the basis of the previously learned pattern, calculates the change of the skin temperature ten seconds hence. The obtained skin temperature ten seconds hence is output as the estimated skin temperature, and input into the skin temperature storage means 43 as an input value for estimating a further future skin temperature (twenty seconds later).

After the lapse of ten seconds from the first estimation of the skin temperature, the skin temperature ten seconds hence (i.e., twenty seconds from the riding) is again estimated. In this case, the input skin temperature is the skin temperature which was estimated in the previous estimation and is stored in the skin temperature storage means 43. Also in this case, similar calculations are conducted to obtain the skin temperature ten seconds hence. In this way, on the basis of the skin temperature calculated from the initially input thermal sensation, the change of the skin temperature is estimated every moment using the environment information of the vicinity of the occupant.

In the apparatus of the second embodiment, the temperature corresponding the skin temperature can be accurately obtained without directly measuring the skin temperature of the occupant. When the infrared thermometer 2 shown in FIG. 1 is used to directly measure the skin temperature of the occupant in a non-contact manner, it is required to always detect the position of the occupant's face, resulting in that moving parts for the detection and detection control system are complex in structure. When the occupant's face is moved, furthermore, it is impossible to conduct the measurement, and hence to correctly control the air condition unit.

According to the system of the second embodiment, since data such as the volume of solar radiation, wind temperature, wind velocity and humidity which are to be always measured are obtained from the instrument disposed on the dash board, seats, etc., it is possible to achieve a practical effect that the skin temperature can be estimated without being affected by the position of the occupant's face or the like. Moreover, the input of the thermal sensation at the riding allows the initial conditions of the occupant to be correctly recognized, whereby the skin temperature can be correctly estimated. When the present system is employed, it is possible to achieve a practically excellent effect that all the infrared thermometer 2 and moving parts relating to it are unnecessary and the structure of the apparatus can be simplified.

In the aforesaid embodiment, the infrared thermometer 2 is used as the direct thermal sensation information detecting means 1 to detect the skin temperature of a occupant. Alternatively, brain waves, sphygmus, skin potential, etc. may be used as thermal sensation information. Instead of directly measuring thermal sensation information of a human body, a signal from a human body-equivalent sensor or model which produces a signal equivalent to that in a human body may be used as thermal sensation information.

The embodiment described above detects the temperature of the room R. In order to more correctly estimate the thermal sensation, the humidity of the room R may be input as required from a humidity sensor (not shown) disposed in the vicinity of a room temperature sensor 27, environment information in the room R such as the temperature of the ceiling may be input from a temperature sensor disposed on the ceiling, etc., and also environment information of the outside such as a temperature and humidity of the outside of the room may be input from an exterior air temperature and humidity sensor 28 disposed in a duct portion at the front end of the automobile. The humidity sensor may be omitted when humidity does not greatly contribute to the thermal sensation information.

In the embodiment described above, information obtained at a sole measuring point is used as the thermal sensation information and room temperature information. Alternatively, the thermal sensation may be measured on the basis of information obtained at multiple measuring points. It is obvious to those skilled in the art that this modification can be accommodated by changing the numbers of input elements and intermediate elements of the thermal sensation estimating means.

Figure 10:
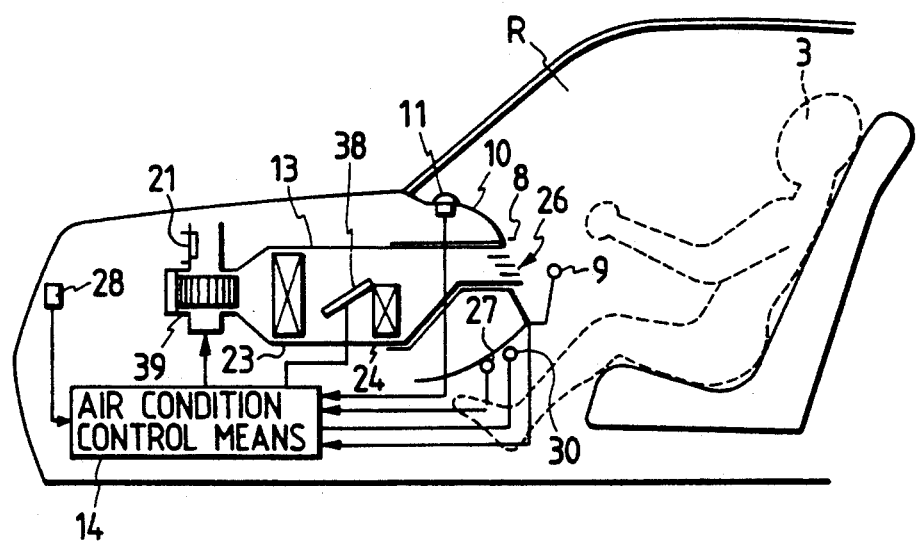
FIG. 10 is a schematic diagram showing the configuration of a third embodiment of the invention.
Figure 11:
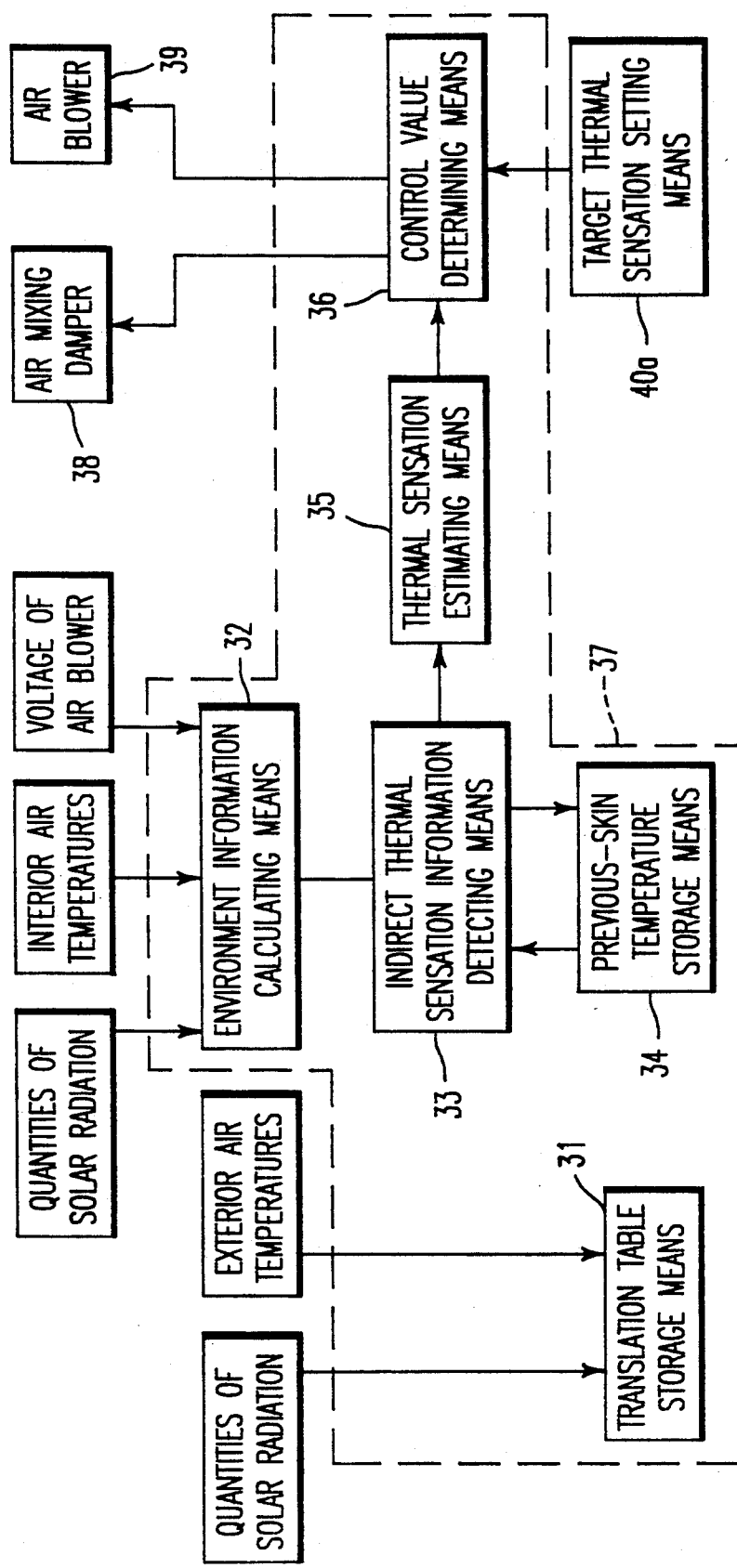
FIG. 11 is a block diagram showing the configuration of the third embodiment of the invention.

An air condition control apparatus of a third embodiment invention will be described with reference to FIGS. 10 to 13. As shown in FIG. 10, an air condition unit 13, which has a usual structure, consists of a room thermometer 27, a room hygrometer 30, a pyrheliometer 11 mounted on a dash board 10, an exterior thermometer 28 for measuring a temperature of the outside of the automobile, a ventilation switching device 21, an evaporator 23, a heater core 24, an air-mixing damper 38, a ventilation air outlet 26, a control value computation device 37, etc.

The control value computation device 37 comprises indirect thermal sensation information detecting means 33, environment information calculating means 32 for calculating information required in the detecting means 33, translation table storage means 31 in which a translation table for estimating the skin temperature at the riding from the exterior temperature and the volume of solar radiation is recorded, previous-skin temperature storage means 34 for storing the skin temperature estimated in the previous estimation, thermal sensation estimating means 35 for estimating the thermal sensation from the skin temperature and the rate of the change of the skin temperature, and control value determining means 36 for determining control values from the difference between the thermal sensation input from target thermal sensation setting means 40a into which a target thermal sensation is input, and the thermal sensation estimated by the thermal sensation estimating means 35.

Figure 12:
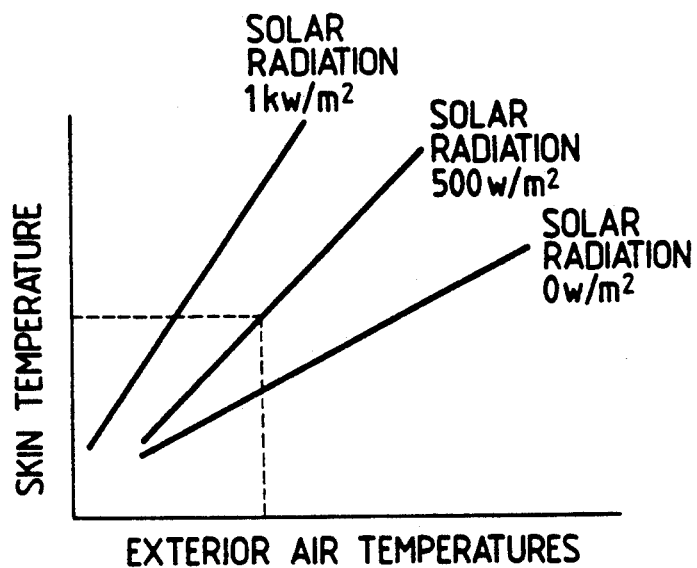
FIG. 12 is a graph showing the relationship between an exterior air temperature and a skin temperature in the third embodiment of the invention.

In the thus configured air condition control apparatus of the third embodiment, when the occupant rides in the automobile and turns on the switch of the air condition unit, the exterior air temperature and volume of solar radiation respectively measured by the exterior thermometer 28 and pyrheliometer 11 are input to the translation table storage means 31. In the translation table storage means 31 which stores exterior air temperatures, volumes of solar radiation and mean skin temperature as shown in FIG. 12, the skin temperature is calculated from the input exterior air temperature and volume of solar radiation. This converted skin temperature is input to the skin temperature storage means 34 as the skin temperature at the starting time, and thereafter input to the indirect thermal sensation information detecting means 33. The volume of solar radiation, air temperature, wind velocity and humidity which are input to the indirect thermaL sensation information detecting means 33 are calculated from the pyrheliometer 11, room thermometer 27, voltage applied to an air blower 39, ventilation switching device 21 and hygrometer 30. With respect to the wind temperature, the indirect thermal sensation information detecting means 33 requires the temperature of the wind which blows against the occupant, and this wind temperature is slightly different from the temperature indicated by the room thermometer 27. Hence, the relationship between the two temperatures is previously obtained to prepare a relational expression or translation table which is then stored in the environment information calculating means 32, so that the wind temperature is obtained from the temperature measured by the room thermometer 27.

Figure 13:
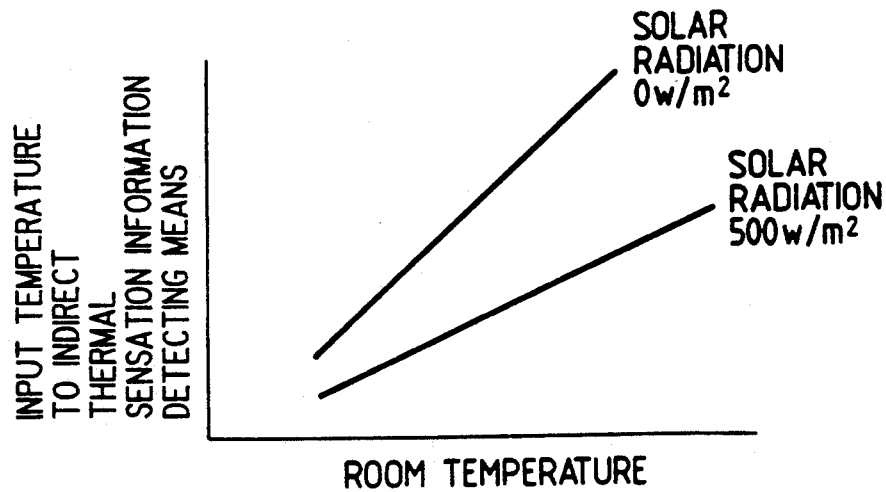
FIG. 13 is a graph showing the relationship between a room temperature and an input temperature of indirect thermal sensation information detecting means in the third embodiment of the invention.

FIG. 13 shows an example of the translation table. In a similar manner, the volume of solar radiation at the vicinity of the occupant is calculated from the value measured by the pyrheliometer 11, the wind velocity at the vicinity of the occupant is calculated from the voltage applied to the air blower 39 and the mode (air circulation of air ventilation) of the ventilation switching device 21, and the humidity is calculated from the hygrometer 30. These calculated values are input to the indirect thermal sensation information detecting means 33 which in turn calculates the change of the skin temperature ten seconds hence from the input current skin temperature, volume of solar radiation, wind temperature, wind velocity and humidity and on the basis of the previously learned pattern. The thermal sensation estimating means 35 estimates the thermal sensation on the basis of the skin temperature obtained there. The skin temperature is input also to the skin temperature storage means 34 as an input value for estimating a further future skin temperature (twenty seconds later). The estimated thermal sensation is input to the control value determining means 36. The control value determining means 36 calculates control valuables from the difference between the estimated thermal sensation and the target value of the target thermal sensation setting means 40a, and controls them with using the air blower 39, evaporator 23, heater core 24 and air-mixing damper 38. After the first control operation is ended, the thermal sensation of the occupant is estimated again on the basis of signals from the pyrheliometer 11, room thermometer 27, voltage applied to the air blower 39, ventilation switching device 21 and hygrometer 30, and in the same calculation method as the above-mentioned method. The skin temperature input to the indirect thermal sensation information detecting means 33 in the second and succeeding estimation process is the value which is stored in the skin temperature storage means 34 as the skin temperature estimated in the previous estimation. In this way, control values are calculated from the thermal sensation obtained by the same technique as the previous one and the preset thermal sensation, and the air blower 39, evaporator 23, heater core 24 and air-mixing damper 38 are controlled. As described above, the indirect thermal sensation information detecting means 33 is combined with the conventional air condition system for an automobile, and this combination is controlled so that the thermal sensation of the occupant becomes coincident with the target value.

In the air condition control apparatus of the third embodiment, since measuring means or the like provided in a conventional air condition system for an automobile are used as they are, it is possible to conduct efficiently and accurately the control of maintaining the thermal sensation of a occupant at a constant level, unlike a conventional system in which the room temperature is controlled so as to be kept at a constant level. The third embodiment can achieve a practically excellent effect that an infrared thermometer for directly measuring the skin temperature of an occupant in a non-contact manner, and a thermometer for measuring a wind temperature and an anemometer which are to be mounted on a seat or the like are unnecessary and the structure of the apparatus can be simplified. Furthermore, the indirect thermal sensation information detecting means 33 may be modified so that values previously calculated by a computer are recorded in the form of a map in a storage device, and during the control operation only the results are extracted from the map. This allows the present apparatus to be easily added to various conventional air condition systems. Regarding the calculations of the wind temperature, wind velocity, humidity and volume of solar radiation which are calculated from the room thermometer 27, ventilation switching device 21, pyrheliometer 11 and hygrometer 30, values relating to them may be loaded in the form of a map. Since a humidity has a small influence on the change of the temperature of an occupant in an air-conditioned automobile, the hygrometer 30 may be omitted.

This invention is not restricted to the embodiments described above in which the invention is applied to an automobile, but can be applied to the air conditioning of other vehicles such as railway vehicles, airplanes and ships, and also to that of the interior of a building.

What is claimed is:

1. An air condition control apparatus comprising:
   indirect thermal sensation information detecting means for detecting information relating to a thermal sensation in the vicinity of an occupant in a room;
   thermal sensation estimating means for estimating an actual thermal sensation on a basis of the history of a thermal sensation information in a predetermined period, said thermal sensation information being output from said indirect thermal sensation information detecting means;
   control pattern storage means for storing a predetermined thermal sensation control pattern for achieving a target thermal sensation;
   control value determining means for determining control values of air to be supplied into said room so that a thermal sensation output from said thermal sensation estimating means coincides with a thermal sensation control pattern stored in said storage means;
   air condition control means for controlling a temperature of said air to be supplied into said room, on a basis of said control value output from said control value determining means; and
   an air blower for supplying said temperature-controlled air into said room in accordance with said control value determined by said control value determining means.

2. An air condition control apparatus as claimed in claim 1, wherein said indirect thermal sensation information detecting means includes a neural network.

3. An air condition control apparatus as claimed in claim 1, further comprising:
   a plurality of sensors for detecting environment information;
   thermal sensation storage means for storing thermal sensation previously estimated in said indirect thermal sensation information detecting means; and
   translation table storage means for storing a translation table for estimating the thermal sensation of said occupant, said translation table storage means being connected to said thermal sensation storage means, wherein:
   said indirect thermal sensation information detecting means estimates a change of thermal sensation information on a basis of initial thermal sensation information output from said thermal sensation storage means and said environment information output from said sensors and applies said change of thermal sensation information into said thermal sensation estimating means.

4. An air condition control apparatus as claimed in claim 3, wherein said sensors detect a temperature, humidity, wind velocity and volume of solar radiation.

5. An air condition control apparatus as claimed in claim 3, further comprising:
   environment information calculating means for converting said environment information detected by said sensors into environment information in the vicinity of said occupant.

6. An air condition control apparatus as claimed in claim 1, further comprising:

direct thermal sensation information detecting means for detecting information relating to an actual thermal sensation of said occupant in a room, said direct thermal sensation information detecting means outputting said actual thermal sensation information to said thermal sensation estimating means.

7. An air condition control apparatus as claimed in claim 1, further comprising:

a plurality of sensors for detecting environment information;

thermal sensation storage means for storing thermal sensation previously estimated in said indirect thermal sensation information detecting means; and translation table storage means for storing a translation table for estimating the thermal sensation of said occupant, said translation table storage means being connected to said thermal sensation storage means, wherein:

said thermal sensation storage means stores a skin temperature, and said translation table storage means stores a translation table for estimating a skin temperature of said occupant.

8. An air condition control apparatus as claimed in claim 7, wherein said translation table storage means stores a translation table for converting a thermal sensation information output from a thermal sensation button into a skin temperature of said occupant.

9. An air condition control apparatus as claimed in claim 7, wherein said translation table storage means stores a translation table for estimating a skin temperature of said occupant from an exterior temperature and a volume of solar radiation.

10. An air condition control apparatus comprising:

indirect thermal sensation information detecting means for detecting information relating to a thermal sensation in vicinity of an occupant in a room;

thermal sensation estimating means for estimating an actual thermal sensation on a basis of the history of a thermal sensation information in a predetermined period, said thermal sensation information being output from said indirect thermal sensation information detecting means;

target thermal sensation setting means for setting a target thermal sensation;

control value determining means for determining control values of air to be supplied into said room so that a thermal sensation output from said thermal sensation estimating means coincides with said target thermal sensation set in said target thermal sensation setting means;

air condition control means for controlling a temperature of said air to be supplied into said room, on a basis of said control value output from said control value determining means; and an air blower for supplying said temperature-controlled air into said room in accordance with said control value determined by said control value determining means.

11. An air condition control apparatus as claimed in claim 10, further comprising:

a plurality of sensors for detecting environment information;

thermal sensation storage means for storing thermal sensation previously estimated in said indirect thermal sensation information detecting means; and translation table storage means for storing a translation table for estimating the thermal sensation of said occupant, said translation table storage means being connected to said thermal sensation storage means, wherein:

said indirect thermal sensation information detecting means estimates a change of thermal sensation information on a basis of initial thermal sensation information output from said thermal sensation storage means and said environment information output from said sensors and applies said change of thermal sensation information into said thermal sensation estimating means.

12. An air condition control apparatus as claimed in claim 10, further comprising:

a plurality of sensors for detecting environment information;

thermal sensation storage means for storing thermal sensation previously estimated in said indirect thermal sensation information detecting means; and translation table storage means for storing a translation table for estimating the thermal sensation of said occupant, said translation table storage means being connected to said thermal sensation storage means, wherein:

said thermal sensation storage means stores a skin temperature, and said translation table storage means stores a translation table for estimating a skin temperature of said occupant.

13. An air condition control apparatus as claimed in claim 11, further comprising:

environment information calculating means for converting said environment information detected by said sensors into environment information in the vicinity of said occupant.

14. An air condition control apparatus as claimed in claim 12, wherein said translation table storage means stores a translation table for estimating a skin temperature of said occupant from an exterior temperature and a volume of solar radiation.

* * * * *

UNITED STATES PATENT AND TRADEMARK OFFICE
CERTIFICATE OF CORRECTION

PATENT NO.   :   5,291,748
DATED        :   March 8, 1994
INVENTOR(S)  :   Matsuei UEDA It is certified that error appears in the above-indentified patent and that said Letters Patent is hereby corrected as shown below:

On the title page, Item [30], the 1st Foreign Application
   Priority Date should read as follows:

--Sep. 11, 1992--

Signed and Sealed this

Fifth Day of July, 1994

Attest:

BRUCE LEHMAN

*Attesting Officer*                     Commissioner of Patents and Trademarks